United States Patent [19]

Henning

[11] 3,955,434
[45] May 11, 1976

[54] POWER TRANSMISSION CHAIN LINK CONSTRUCTION

[76] Inventor: Kurt Henning, Georgensteinstr. 16, 8 Munich 71, Germany

[22] Filed: Nov. 20, 1974

[21] Appl. No.: 525,468

[30] Foreign Application Priority Data
Nov. 23, 1973 Germany.......................... 2358451

[52] U.S. Cl. ............................. 74/245 R; 74/250 R; 74/251 R; 74/252
[51] Int. Cl.² ......................................... F16G 13/06
[58] Field of Search............... 74/251 R, 251 S, 252, 74/250 R, 245 R

[56] References Cited
UNITED STATES PATENTS

| | | | |
|---|---|---|---|
| 958,676 | 5/1910 | Dodge | 74/251 S X |
| 1,115,431 | 10/1914 | Howson | 74/251 S |
| 1,119,582 | 12/1914 | Dodge | 74/251 S |

Primary Examiner—Samuel Scott
Assistant Examiner—F. D. Shoemaker
Attorney, Agent, or Firm—Learman & McCulloch

[57] ABSTRACT

A power transmission chain having pivotally interconnected links comprises link plates and stop members with stop faces for limiting the pivot angle between successive links, the link plates and the stop members being formed by fixedly interconnected coplanar members having gaps between cooperating stop faces, the gaps being covered by a guard.

24 Claims, 24 Drawing Figures

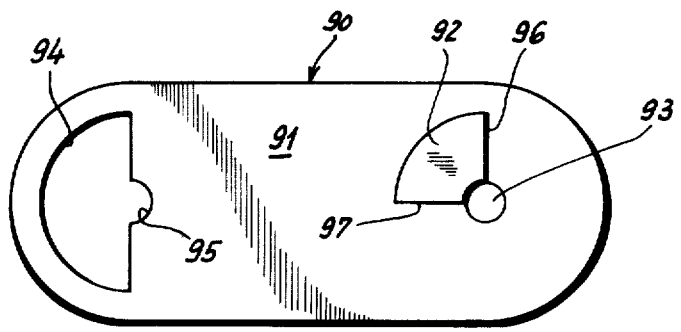
Fig. 16
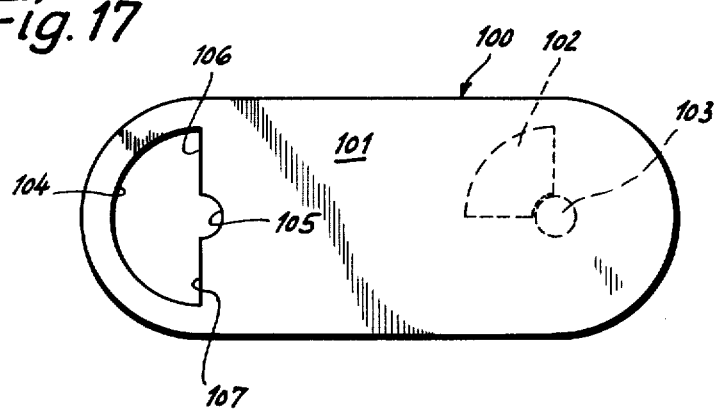
Fig. 17
Fig. 18
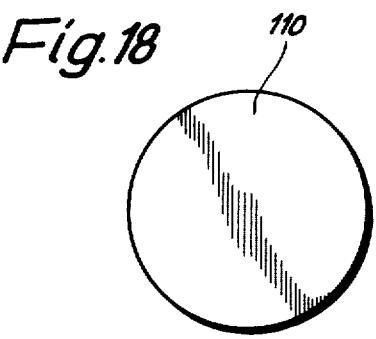
Fig. 19
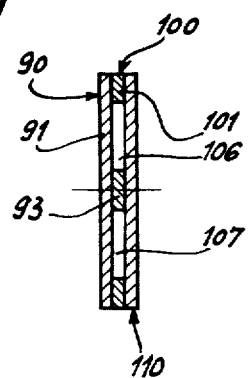

POWER TRANSMISSION CHAIN LINK CONSTRUCTION

Power transmission chains are known from German Pat. No. 963,077 in which gaps between cooperating stop faces open and close during the movement of the chain, thereby risking considerable danger of injury in the region of these gaps.

A power transmission chain is further known from German Pat. No. 1,250,711 in which stop members are mounted on or between the alternately single and double rectangularly formed links. However, the gaps in the region of the outer stop members are not covered toward one side of the links. In this embodiment as well there is therefore a danger of accident and injury.

A covering of the gaps between cooperating stop faces on both sides of the links is provided in a further known power transmission chain, as disclosed in German specification No. 1,935,360, in which the stop members articulately connected together by the pins are deformed in the region of their stop faces by bending with respect to the plane of the pivot joint in such a manner that the stop faces of adjacent stop members lie in the same plane. The gaps are covered toward the two sides of the links by external protective elements. A particular disadvantage with this construction is the considerable production expenditure necessitated by deforming of all tthe stop members.

A power transmission chain is also known from U.S. Pat. No. 3,448,954, FIGS. 14 to 16, in which each link consists of two fixedly interconnected plates, the one of which on the one side of the link has a substantially sector-shaped recess and the other of which on the other side of the link has a substantially sector-shaped projection of smaller peripheral angle than said recess. In the assembled state the projections extend into the recesses of the adjacent link, the radially extending faces of the projections and recesses forming the cooperating stop faces which limit the pivot angle of adjacent links. In one such embodiment the opening and closing gaps are satisfactorily closed on all outer sides. A disadvantage, however, is the high production technical expenditure necessary to make the projections and recesses, requiring cutting of the plates needed to make the links.

Finally, a power transmission chain is known from German utility model No. 6,604,853, FIG. 8, in which every other side plate in the region of the pivot joints comprises a punched cut-out which widens in sector-shaped manner toward two opposite sides. Extending into this cut-out, which has four stop faces, is an elongate stop member which is disposed between two parts of the double adjacent side plates. Thus, in this embodiment although the gaps between cooperating stop faces are satisfactorily covered toward the two sides and production is substantially simpler than in the aforementioned cases due to using only planar members, difficulties arise when chains are to be made for different radii of curvature; i.e., for different maximum pivot angles between adjacent links. For this purpose, in the case of the last mentioned known chain, cut-outs of different size must be made in the side plates and this involves high tool costs.

An object of this invention is to avoid the aforementioned defects of the known constructions and provide a power transmission chain which completely eliminates any danger of accident in the region of the stop faces.

Another object is to provide a chain of simple and economical construction which eliminates the distribution of forces onto large stop faces even when the power transmission chain must be made with radii of curvature of different magnitudes.

These objects are achieved according to the invention in that the stop members have the form of circular sectors which are cut away in the region of their center of curvature, coinciding with the pivot joint axis of adjacent links, an amount corresponding to the dimension of the pivot joint connecting element.

The construction of the stop members in the form of circular sectors makes it possible to start from a basic element, for instance, from a full circular disc or a half disc obtained by dividing the full disc, and with a single straight punching cut make a stop member having the peripheral angle required for the particular desired radius of curvature of the power transmission chain. Thus, no complicated punching tools are required to make power transmission chains of different radii of curvature.

The circular sector-shaped stop members must be cut out in the region of their center of curvature corresponding to the dimension of the pivot joint connecting elements, for example a pivot pin, so that the stop faces of adjacent side plates are in the same plane. This cutting out of the sector-shaped stop members in the region of the center of curvature does not however require a separate working operation for different radii of curvature; the stop members are conveniently stamped out of basic parts, for example a full disc or a half disc, which already have a corresponding cut-out in the center.

Since the links in the power transmission chain according to the invention consist solely of planar parts which do not require bending or other deforming or any cutting operation, an extremely simple and thus particularly economical production of the entire chain results.

The side plates, stop members and any other individual parts of the links may be made of metal or of plastic. Combinations of these two materials are also possible. It may be advantageous for individual relatively movable parts to consist of self-lubricating material or sliding metals.

Numerous details of the invention are apparent from the subsidiary claims.

Several embodiments of the invention are illustrated in the drawings, wherein.

Figure 1:
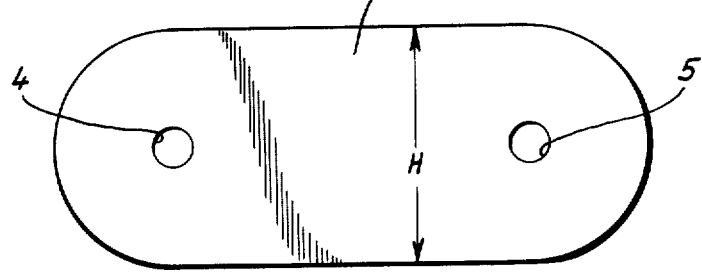
FIGS. 1 – 3 are side views of individual parts of a first embodiment.
Figure 2:
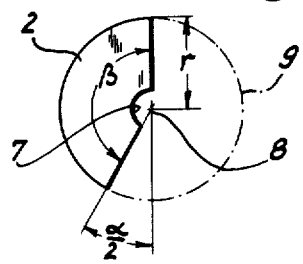
Figure 3:
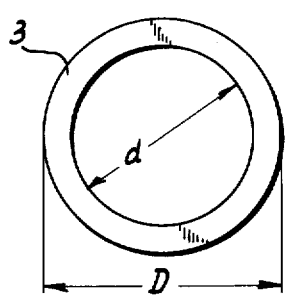

FIGS. 8 and 9, 10 and 11, 12 and 13, 14 and 15 are side views (corresponding to FIGS. 4 and 5) in each case of two side plates of four further embodiments of the invention;

FIGS. 16, 17 and 18 are side views of individual parts of a further embodiment;

FIG. 19 is a section through the pivot joint of the chain link according to FIGS. 16 to 18; and FIGS. 20 to 24 illustrate three further embodiments FIGS. 1 to 3 show the individual parts of the links of the first embodiment, i.e., a side plate 1, a stop member 2 and a protective guard ring 3.

The side member 1 is provided with holes 4 and 5 to receive pins 6 (FIG. 7) which establish the pivot joint connection between successive links.

The stop member 2 comprises substantially the form of a circular radially extending sector having a peripheral angle β which is smaller, by the angle α/2, than 180°. The angle α is the maximum pivot angle of adjacent links, cf. FIG. 6.

The stop member 2 has a cut out 7 in the region of its center of curvature corresponding to the size of the pin 6.

The stop member 2 is conveniently made from a solid disc 9 which is provided with a central hole 8 and which is first divided along a diameter into two half discs, a stop member 2 then being made from each of these two half discs by a single straight punch cut.

The protective ring 3 has an internal diameter d which corresponds substantially to twice the radius r of the stop member 2. The outer diameter D of the protective guard ring 3 corresponds substantially to the height H of the side plate 1.

Figure 4:
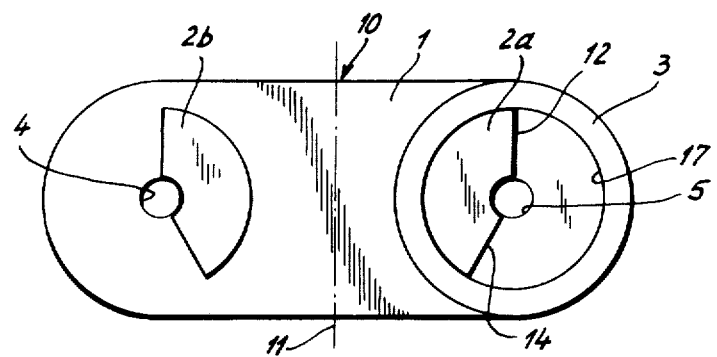
FIGS. 4 and 5 are side views of two successive chain side plates of the first embodiment in the separated state.
Figure 5:
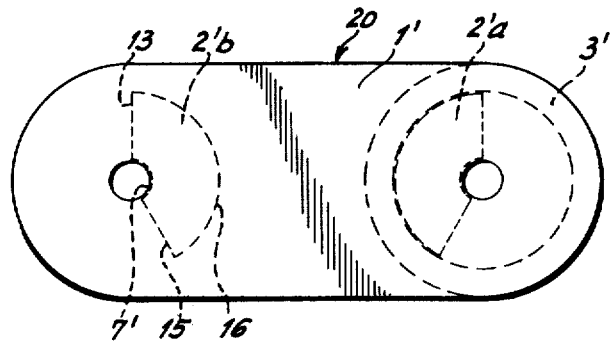

To make the link 10 illustrated in FIG. 4, two stop members 2a, 2b (corresponding to the stop member 2 of FIG. 2) are arranged on one face of a side member 1 in such a manner that they are in mirror-image relationship with respect to the plane of symmetry 11 of the two pivot holes 4, 5. The protective ring 3 is arranged concentrically with respect to the stop member 2a. The stop members 2a, 2b and the protective ring 3 are connected for example by spot welding fixedly to the side plate 1.

In corresponding manner the link 20 (cf. FIG. 5) is made up of a side plate 1', two stop members 2'a, 2'b and a protective guard ring 3'. These parts are however arranged on the face of the side plate 1' which confronts the plate 1 and for this reason are shown in dashed line in FIG. 5.

If the links 10 and 20 are now placed over each other (cf. FIG. 6) the stop member 2'b of the link 20 comes to lie in the recess which is formed by the stop member 2a and the protective ring 3 of the link 10. The two links 10 and 20 may consequently be pivoted about the pin 6 between an extended position limited by the stop faces 12 and 13 and an angular position limited by the stop faces 14 and 15.

During pivotal movement of the links 10, 20 the arcuate outer face 16 of the stop member 2'b slides on the circular inner face 17 of the protective ring 3 which in conjunction with the cut-out 7' of the stop member 2'b sliding on the pin 6 provides excellent pivotal guiding.

Figure 6:
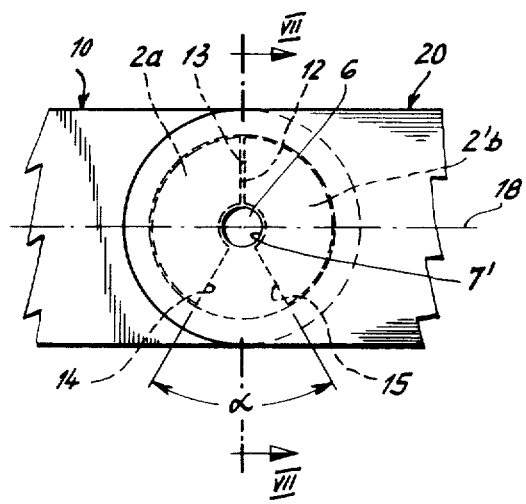
FIG. 6 is a side view of the side plates according to FIGS. 4 and 5 in the assembled state.
Figure 7:
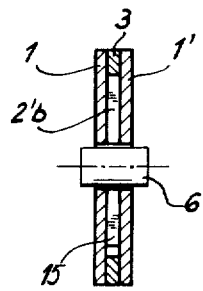
FIG. 7 is a section along the line VII—VII of FIG. 6.

As is apparent from FIGS. 6 and 7, in the region of the pivot joint only a triplicate material thickness is present; the guard rings 3 and stop members 2a and 2'b of adjacent links lie in the same plane and the gaps between the cooperating stop faces of the stop members are covered toward the two confronting sides by the side plates 1 and 1' and toward the radially outer ends by the protective ring 3.

In this embodiment all the stop members are made identical. The stop members 2 and the protective ring 3 may be made in a particularly economical manner from the material point of view by first punching out of a solid disc with the diameter D (cf. FIG. 3) a solid disc with the diameter d (preferably simultaneously forming the hole 8) to form the protective ring 3; from this latter disc the stop members 2 are then punched with the desired peripheral angle β in the manner already explained.

In the embodiment illustrated in FIGS. 1 to 7 the stop faces 12, 13 (cf. FIG. 6) limit the extended position of adjacent links 10, 20 and lie substantially perpendicular to the plane 18 connecting adjacent pivot joints.

Figure 8:
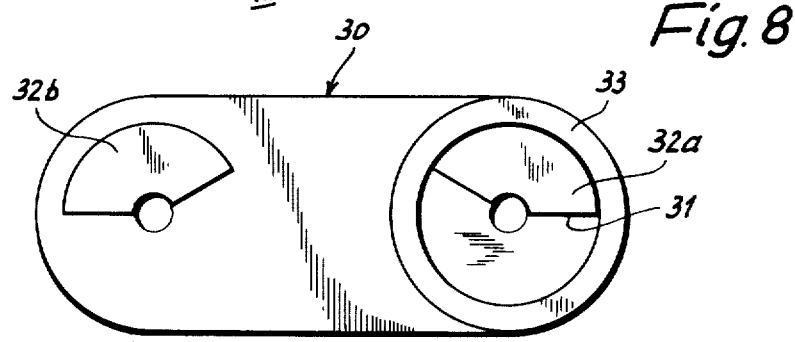
Figure 9:
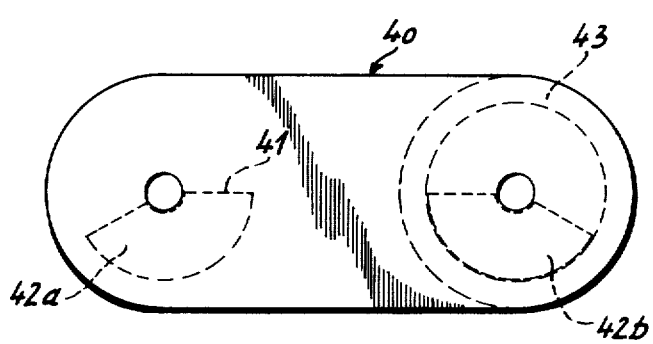

FIGS. 8 and 9, however, show an embodiment in which the stop faces 31, 41 limit the extended position of adjacent links 30, 40 and lie substantially in the plane connecting adjacent pivot joints.

Apart from this turned arrangement of the stop members 32a, 32b and 42a, 42b the construction of the links corresponds completely to the embodiment of FIGS. 1 to 7. In this case as well each of the two side plates is thus provided with a protective ring 33 and 43.

Figure 10:
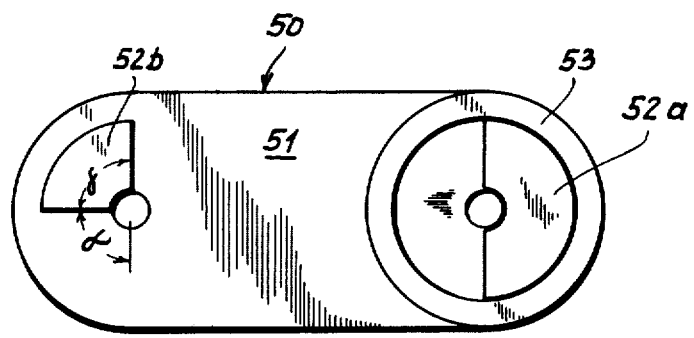
Figure 11:
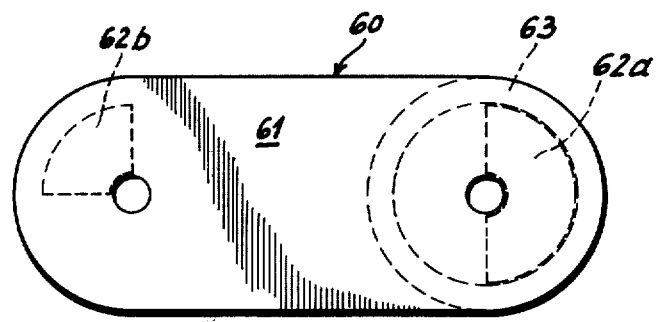

FIGS. 10 and 11 show an embodiment in which the side plate 51 of the link 50 carries a stop member 52a which has a peripheral angle of 180° and a stop member 52b whose peripheral angle δ is an angle less than 180° (in this embodiment the angle α representing the maximum pivot angle between adjacent links is assumed to be 90°). As in the examples described above a protective ring 53 is further placed on the side plate 51.

In corresponding manner the link 60 comprises on the side plate 61 two stop members 62a and 62b and a protective ring 63. The function corresponds to the examples described above.

Figure 12:
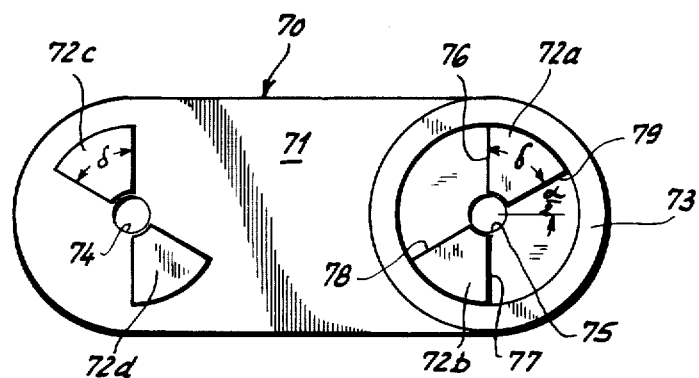
Figure 13:
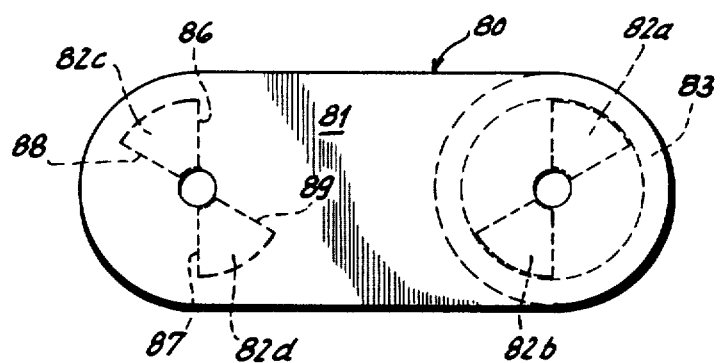

In the embodiment illustrated in FIGS. 12 and 13 the side plate 71 of the link 70 is provided with four identically constructed stop members 72a, 72b, 72c and 72d which are arranged in pairs diametrically opposite and symmetrically with respect to the associated pivot holes 74, 75. These stop members 72a to 72d each occupy a peripheral angle δ which is an angle α/2 less than 90° (in this case as well α is the maximum pivot angle of adjacent chain links). The side plate 71 further carries a protective ring 73.

In corresponding manner, the link 80 consists of a side plate 81, four fitted stop members 82a to 82d and a protective ring 83.

If the two chain links 70 and 80 are placed on each other so that the stop members are in the same plane, then in the extended position of the links the stop faces 76, 86 and 77, 87 abut whereas the maximum angle position is limited by the stop faces 78, 88 and 79, 89.

Figure 14:
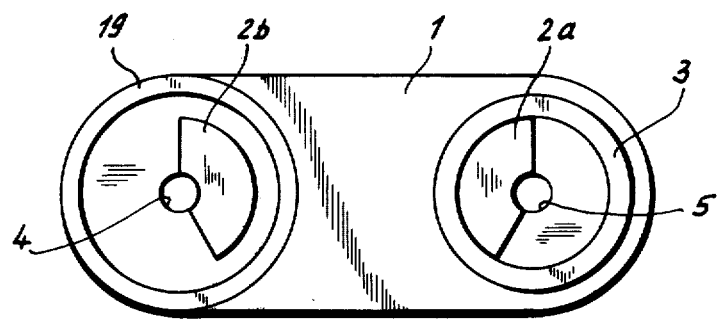
Figure 15:
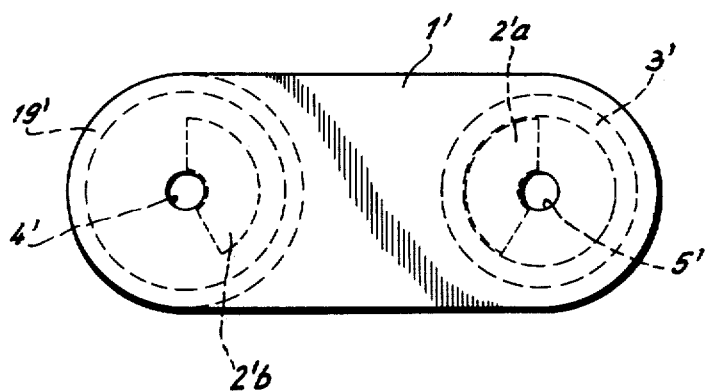

The embodiment of FIGS. 14 and 15 corresponds substantially to the embodiment according to FIGS. 1 to 7. The same parts are thus provided with the same reference numerals. Additionally, however, each side plate 1 and 1' is fixedly connected to a guide ring 19 and 19' which is also made as a planar member with the same wall thickness as the stop members 2a, 2b and 2'a, 2'b. The inner diameter of the guide rings 19, 19' corresponds substantially to the outer diameter of the protective rings 3 and 3' respectively. Since these guide rings 19, 19' are disposed concentrically to the associated pivot joint holes 4, 4', the guide ring (e.g. 19') of a link (e.g. 1') in the assembled state surrounds the protective link (e.g. 3) of the adjacent link (e.g. 1) with sliding clearance. This results in a particularly good pivotal guiding of the links.

In the embodiment illustrated in FIGS. 16 to 19 the side plate 91 of the link 90 is fixedly connected to a stop member 92 and also comprises in the region of said pivot joint a circular bearing disc 93 whose wall thickness corresponds substantially to that of the stop member 92. The stop member 92 and the bearing disc 93 may for example be spot connected to the side plate 91.

In the region of the other pivot joint the side plate 91 is provided with a recess 94 which also has the form of a circular sector which is additionally cut away as at 95 in the region of the pivot bearing.

The link 100 is made in a completely identical manner and contains — however on the other face of the plate 101 — a stop member 102 and a bearing disc 103; furthermore, a recess 104 is provided.

If the chain links 90 and 100 are placed on each other the stop member 92 is accommodated within the recess 104 and the bearing disc 93 engages the cut-out 105. The extended position is limited by abutment of the stop faces 96 and 106 and the angle position by abutment of the stop faces 97 and 107.

To cover the gap between the cooperating stop faces toward the second side as well (to one side it is covered by the side plate 91) a disc 110 is provided. When the links 90 and 100 are placed on each other in the manner explained said disc 110 is positioned over the link 100 and for example connected by spot welding to the stop member 92 and the bearing disc 93. This embodiment is thus a chain without a continuous joint pin, a variant which of course can also be realized in the examples of embodiment of FIGS. 1 to 15.

Like all the embodiments described above the embodiment according to FIGS. 16 to 19 is distinguished by the particular simplicity with which different radii of curvature of the chain may be obtained. For this purpose in this case as well only circular sector-shape stop members 92 need be punched out with different peripheral angles, which can be done by simple straight punch cuts starting from a solid disc provided with a central hole. The recess 94 provided in the side plate 91 remains unchanged for all radii of curvature.

Figure 20:
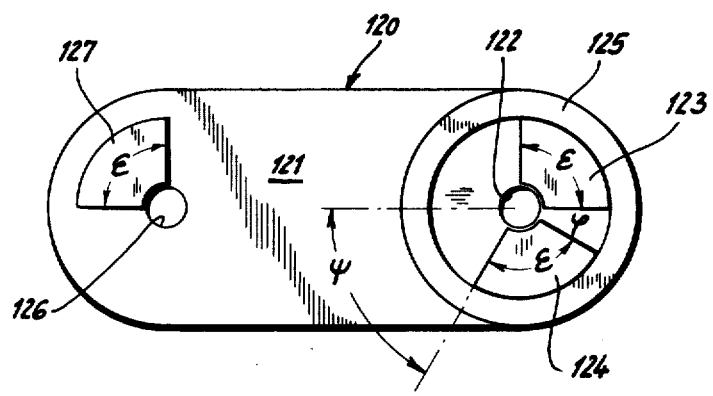

FIG. 20 shows a variant of the embodiment of FIGS. 10 and 11 (only the link 120 corresponding to the link 50 is illustrated).

Arranged on the side plate 121 in the region of the one joint hole 122 are two stop members 123, 124 and a protective ring 125 whereas in the region of the other joint hole 126 a stop member 127 is provided.

The three stop members 123, 124 and 127 are each made identical. They have a peripheral angle $\epsilon$ which in the example is made equal to 90°. Between the stop members 123 and 124 there is an angular distance whose value is equal to $360 - 3\epsilon - \psi$, where $\psi$ is the desired maximum pivot angle of adjacent links.

The particular advantage of this embodiment thus resides in that with identically constructed stop members any desired radius of curvature of the chain may be obtained. For this purpose the stop members 123, 124 are merely spot connected by means of a suitable pattern in the necessary angular distance $\phi$ on to the side plate 121. This substantially simplifies production and storing.

Figure 21:
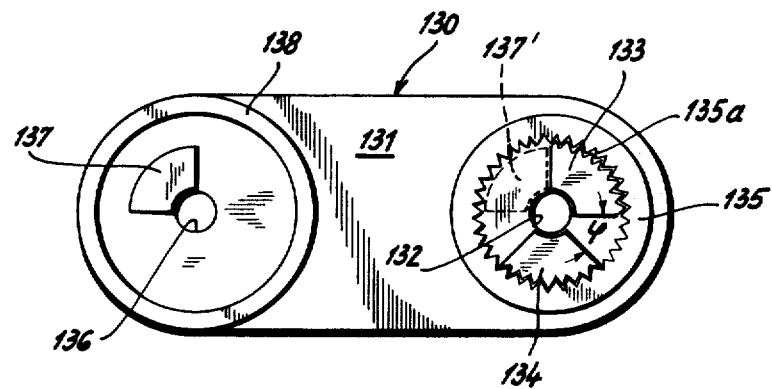

FIG. 21 illustrates a further embodiment of a link 130 which represents a modification of the examples of FIGS. 14 and 15 on the one hand and FIG. 20 on the other. Provided on the side plate 131 in the region of the one pivot joint hole 132 are two stop members 133 and 134 and a protective ring 135. The protective ring 135 is fixedly connected to the side plate 131, for example by spot welding, and carries a toothing 135a at its inner periphery. The two stop members 133, 134 are provided with a corresponding outer toothing. On assembly they are inserted into the protective ring 135 in such a manner that between them the angular spacing $\phi$ necessary for the desired radius of curvature of the chain is obtained. The stop members 133, 134 may then also be welded to the side plate 131, but this is not essential.

In the region of the other pivot joint hole 136 a stop member 137 fixedly connected to the side plate 131 is provided as well as an outer guide ring 138 which as in the embodiment of FIGS. 14 and 15 surrounds the protective ring of the adjacent link with a sliding fit.

The stop member 137 comprises in this example an outer radius which is somewhat smaller than the innermost radius of the toothing 135a of the protective ring 135. If adjacent links are placed on each other the stop member 137' of the adjacent link may turn in the recess formed by the stop members 133, 134 and the protective ring 135, the arcuate periphery of the stop member 137' not however being in contact with the inner toothing 135a of the protective ring 135. The necessary pivot guiding is effected on the one hand between the protective ring 135 and the guide ring of the adjacent link surrounding it and on the other hand between the inner arcuate cut-outs of the stop members and the connecting pins of adjacent links.

The particular advantage of this embodiment is that by setting the angular distance $\phi$ between the stop members 133 and 134 the radius of curvature of the chain can be adapted at the place of installation to the particular conditions encountered. In addition the user has the possibility of changing the radius of curvature of the chain by subsequently readjusting the angle $\phi$.

Figure 22:
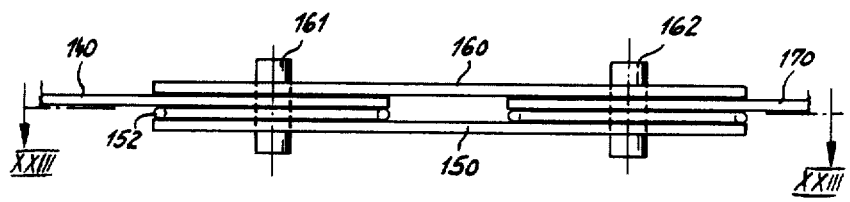
Figure 23:
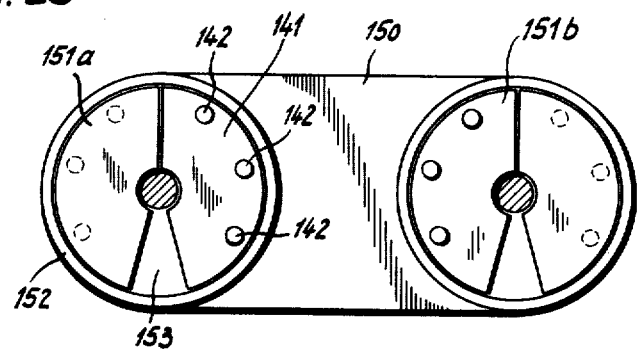
Figure 24:
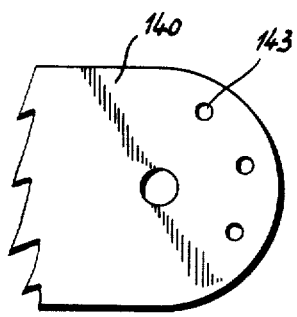

In the embodiment illustrated in FIGS. 22 to 24 the side plate 140 is connected to the stop member 141 by studs 142 which engage in the holes 143 of the side plate 140. The studs 142 may for example be pressed out of the material of the stop member 141. However, pins may also be inserted into corresponding holes of the stop member 141.

The side plate 150 of the following link correspondingly contains stop members 151a, 151b which are also non-rotatably connected to the side plate 150 by studs. Protective rings 152 close the gaps 153 between the cooperating stop members with respect to the ends.

In the region of every other link a further side plate 160 is provided which connects together the two pins 161, 162 of the link. The two side plates 150, 160 thus enclose between them the side plates 140 and 170 of the adjacent links.

In this embodiment the stop members are nonrotatably but detachably connected to the associated side plates and the protective rings 152 are loosely fitted. It is obvious that these construction features may also be used in the other examples described above.

Finally, it is emphasized that in the region of every pivot joint, if necessary, several pairs of stop members may be exposed with interposition of side plates over each other if a particularly large stop area is required.

Furthermore, in this, as in the other examples it is possible for the stop members to be connected to the side plates in such a manner, for example, that the stop member 151a is connected to the side plate 140 and the stop member 141 to the plate 150 (cf. FIGS. 22 23).

What is claimed is:

1. A power transmission chain link construction comprising a pair of side-by-side link plates; means pivotally connecting said plates for angular adjustment about an axis between two extreme positions; coplane stop members carried by the respective plates adjacent said axis and extending radially thereof, said stop members having stop surfaces spaced from one another by a gap when said plates are in one of said extreme positions and engageable with one another when said plates are adjusted angularly about said axis to the other of said extreme positions; and guard means coplaner with said stop members and carried by one of said plates, said guard means extending circumferentially of said stop members and being of such angular length as to span said gap in all angularly adjusted positions of said plates.

2. A construction according to claim 1 wherein each of said stop members projects from its associated plate in a direction toward the other plate.

3. A construction according to claim 1 wherein one of said stop members has a recess and wherein the other of said stop members extends into said recess.

4. A construction according to claim 1 wherein said guard means comprises a ring member interposed between said plates and encircling said stop members.

5. A construction according to claim 4 wherein said ring member has an inner diameter corresponding substantially to twice the radius of said stop members.

6. A construction according to claim 4 wherein said ring member has a wall thickness corresponding substantially to that of said stop members.

7. A construction according to claim 1 wherein said stop surfaces lie substantially perpendicular to a plane passing through the connecting means of adjacent link plates of said chain.

8. A construction according to claim 1 wherein said stop surfaces lie substantially parallel to a plane passing through the connecting means of adjacent link plates of said chain.

9. A construction set forth in claim 1 wherein said stop members are identical in configuration.

10. A construction according to claim 9 wherein each of said stop members forms a peripheral angle less than 180°.

11. A construction according to claim 10 wherein said stop members are arranged in mirror image with respect to the plane of symmetry of said axis.

12. A construction according to claim 1 wherein one of said stop members has a peripheral angle of 180° and wherein the peripheral angle of the other of said stop members is less than 180° by an amount corresponding to the maximum pivot angle of said link plates.

13. A construction according to claim 1 wherein each of said link plates has two identical stop members arranged in pairs diametrically opposite and symmetrical with respect to said axis, each of said stop members occupying a peripheral angle which is less than 90° by an amount corresponding to the maximum pivot angle of said link plates.

14. A construction according to claim 1 wherein said guard means comprises a ring carried by each of said link plates, the ring of one of said plates slidably fitting into the ring of the other of said plates.

15. A construction according to claim 14 wherein each of said rings has the same wall thickness as that of said stop members.

16. A construction according to claim 1 wherein the means pivotally connecting said link plates comprises a pin extending through each of said link plates.

17. A construction according to claim 1 wherein one of said link plates has two of said stop members thereon in circumferentially spaced relation and the other of said link plates has one of said stop members thereon and interposed between said two stop members, said one stop member having a peripheral angle less than the spacing between said two stop members by an amount corresponding to the maximum pivot angle of said link plates.

18. A construction according to claim 17 wherein said two stop members and said one stop member are identical.

19. A construction according to claim 17 wherein at least one of said two stop members is adjustable relatively to said one of said link plates whereby the spacing between said two stop members is adjustable.

20. A construction according to claim 17 wherein the guard means comprises a ring encircling all of said stop members.

21. A construction according to claim 20 wherein said ring is toothed at its inner periphery and wherein each of said two stop members is correspondingly toothed and in engagement with teeth of said ring.

22. A construction set forth in claim 21 wherein said one of said stop members has a smooth peripheral surface spaced radially inwardly from the toothed periphery of said ring.

23. A construction according to claim 1 wherein said stop members are detachably connected to their respective link plates by studs.

24. A construction according to claim 1 including a connecting link connected to said pivot means for connecting said link plates to a pair of similar link plates.

* * * * *